United States Patent
Gaikwad (10) Patent No.: US 11,301,443 B2
(45) Date of Patent: *Apr. 12, 2022

(54) DATABASE WORK FILE STORAGE LIMIT FACILITY

(71) Applicant: Bank of America Corporation, Charlotte, NC (US)

(72) Inventor: Deepak Gaikwad, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 232 days.

This patent is subject to a terminal disclaimer.

(21) Appl. No.: 16/733,371

(22) Filed: Jan. 3, 2020

(65) Prior Publication Data

US 2020/0142871 A1 May 7, 2020

Related U.S. Application Data

(63) Continuation of application No. 15/350,775, filed on Nov. 14, 2016, now Pat. No. 10,528,535.

(51) Int. Cl.
*G06F 16/21* (2019.01)
*G06F 16/242* (2019.01)
*G06F 16/23* (2019.01)

(52) U.S. Cl.
CPC ........ *G06F 16/217* (2019.01); *G06F 16/2379* (2019.01); *G06F 16/242* (2019.01)

(58) Field of Classification Search
CPC ... G06F 16/217; G06F 16/2379; G06F 16/242
(Continued)

(56) References Cited

U.S. PATENT DOCUMENTS

| 5,860,069 A | 1/1999 | Wright |
| 6,678,824 B1 * | 1/2004 | Cannon .................. A63F 13/10 726/22 |

(Continued)

OTHER PUBLICATIONS

IBM Manual—DB2 10 for z/OS Managing Performance, Nov. 2013, internet http://publib.boulder.ibm.com/epubs/pdf/dsnpgm09.pdf, pp. 1-1093.

(Continued)

*Primary Examiner* — Hicham Skhoun
(74) *Attorney, Agent, or Firm* — Banner & Witcott, Ltd.

(57) ABSTRACT

Some aspects as disclosed herein are directed to, for example, a system and method of configuring one or more configurable database work file limits and performing one or more actions in response to reaching or approaching the work file limits. The method may comprise determining, by a computing device, a user identifier associated with a user and an application identifier associated with an application. The computing device may determine, based on the user identifier and the application identifier, a workfile storage usage threshold associated with the user and the application. The computing device may determine whether a workfile storage usage associated with the user and the application approaches or exceeds the workfile storage usage limit. In response to determining that the workfile storage usage associated with the user and the application approaches or exceeds the workfile storage usage limit, the method may comprise determining a database language statement associated with the workfile storage usage approaching or exceeding the workfile storage usage limit and/or generating a notification comprising the database language statement and the workfile storage usage associated with the user and the application.

18 Claims, 8 Drawing Sheets

(58) Field of Classification Search
USPC .......................................................... 707/707
See application file for complete search history.

(56) References Cited

U.S. PATENT DOCUMENTS

| | | | |
|---|---|---|---|
| 7,194,451 | B2 | 3/2007 | Chaudhuri et al. |
| 7,206,845 | B2 | 4/2007 | Banning et al. |
| 7,676,692 | B2 | 3/2010 | Costlow et al. |
| 7,720,802 | B2 | 5/2010 | Christenson et al. |
| 7,840,752 | B2 | 11/2010 | Hu et al. |
| 7,873,664 | B2 | 1/2011 | Andersch et al. |
| 8,341,178 | B2 | 12/2012 | Belknap et al. |
| 9,141,526 | B2 | 9/2015 | Iliadis |
| 9,369,389 | B1 * | 6/2016 | Weiser .................. H04L 47/822 |
| 2006/0074872 | A1 | 4/2006 | Gordon |
| 2006/0074956 | A1 | 4/2006 | Marwah |
| 2006/0248080 | A1 | 11/2006 | Gray |
| 2008/0208882 | A1 | 8/2008 | Zhang et al. |
| 2009/0100478 | A1 * | 4/2009 | Craner ............. H04N 21/47214 725/87 |
| 2012/0102454 | A1 | 4/2012 | Burghard et al. |
| 2012/0155296 | A1 * | 6/2012 | Kashanian .......... H04M 15/853 370/252 |
| 2012/0158770 | A1 | 6/2012 | Benadjaoud et al. |
| 2013/0073702 | A1 * | 3/2013 | Umbehocker .......... G06F 3/067 709/222 |
| 2013/0185708 | A1 * | 7/2013 | Bhat ................... G06F 9/44552 717/170 |
| 2015/0067696 | A1 * | 3/2015 | Peeters ................... G06F 9/505 718/105 |
| 2015/0195180 | A1 * | 7/2015 | Gaikwad ............. G06F 11/3485 709/224 |
| 2016/0188617 | A1 | 6/2016 | Gaikwad |

OTHER PUBLICATIONS

Macro-Name=DSNDQWS1, Descriptive-Name=DB2, Self Defining Section Mapping Macro for Data Base Statistics (IFCID=0002), Licensed Materials—Property of IBM 5635-DB2, Copyright 1982, 2006 IBM Corp., pp. 1-3.
Macro-Name=DSNDQIST, Licensed Materials—Property of IBM 5605-DB2, Copyright 1982, 2010 IBM Corp., pp. 1-7.
Macro-Name=DSNDQW01, Descriptive-Name = IFC Mapping Macro for IFCIDS 0058-0139, Licensed Materials—Property of IBM 5605-DB2, Copyright 1982, 2010 IBM Corp., pp. 1-78.
Macro-Name=DSNDQW04, Descriptive-Name = IFC Mapping Macro for IFCIDS 0250-360, Licensed Materials—Property of IBM 5605-DB2, Copyright 1982, 2010 IBM Corp., pp. 1-108.
IBM Support, "LUWID in the messages—How do I trace the TCP/IP address and port to understand the location/user it is coming from;" http://www.-01.ibm.com/support/docsview.wss?uid=swg21055269; Accessed Oct. 3, 2016.
IBM Knowledge Center—IFCID Records Blocks—https://www.ibm.com/support/knowledgecenter/SSUSPA_5.3.0/com.ibm.omegamon.xe.pm_db2.doc_5.3.0/ko2rr/p7ifcidrec.htm; Accessed Sep. 27, 2016.
IBM Knowledge Center—"IFCID 376—Incompatible Functions Executed;" https://www.ibm.com/support/knowledgecenter/en/SSUSPA_5.3.0/com.ibm/omegamon.xe.pm_db2.doc_5.3.0/ko2rr/r0376out.htm; Accessed Sep. 27, 2016.
IBM Knowledge Center—"IFCID 366—Incompatible Functions Executed;" https://www.ibm.com/support/knowledgecenter/en/SSUSPA_5.3.0/com.ibm.omegamon.xe.pm_db2.doc_5.3.0/ko2rr/r0366out.htm; Accessed Sep. 27, 2016.
IBM Knowledge Center; "IFCID 317—SQL Statement String;" https://www.ibm.com/support/knowledgecenter.en/SSUSPA_5.3.0/com.ibm.omegamon.xe.pm_db2.doc_5.3.0/ko2rr/r0317out.htm; Accessed Sep. 27, 2016.
IBM Knowledge Center; Declare Global Temporary Table Statement—http://www.ibm.com/support/knowledgecenter/SSEPGG_9.7.0/com.ibm.db2.luw.sql.ref.doc/doc/r0003272.html; Accessed Oct. 3, 2016.
IBM Knowledge Center—DB2 Automation Tool V.4.1—WTO Messages; http:www.ibm.com/support/knowledgecenter/SSAUWB_4.1.0/com.ibm.db2tools.haa41.doc.ug/topics/haauref_wto.htm; Accessed Oct. 3, 2016.
IBM Knowledge Center—Max Temp STG/Agent Field (MaxTemps Subsystem Parameter—http://www.ibm.com/support/knowledgecenter/SSEPEK_10.0.0/inst/src/tpc/db2z_ipf_maxtemps.html; Accessed Oct. 3, 2016.
IBM Support—II14587:DB2 V9, V10 & V11 Workfile Recommendations—http://www-01.ibm.com/support/docview.wss?uid=isg1II14587; Accessed Sep. 27, 2016.
Installation and Migration Guide—DB2 11 for z/OS; IBM Corporation; Sixth Edition (Aug. 2014).
IBM—DB2 Help (Application ID); https://www1.columbia.edu/sec/acis/db2/db2help/db2h2102.htm; Accessed Oct. 3, 2016.
IBM Knowledge Center—IFCID 002—DB2 Statistics—Accessed Nov. 9, 2016; http://www.ibm.com/support/knowledgecenter/SSUSPA_5 3.0/com.ibm.omegamon.xe.om_db2.doc_5.3.0/ko2rr/r0002intro.htm.
IBM Knowledge Center—IFCID 258—Data Set Extend Activity—Accessed Nov. 9, 2016; http://www.ibm.com/support/knowledgecenter/SSUSPA_5.3.0/com.ibm.omegamon.xe.pm_db2.doc_5.3.0/ko2rr/r0258out.htm.
IBM Knowledge Center—IFCID 342—WF/Temp DB Usage—Accessed Nov. 9, 2016; http://www.ibm.com/support/knowledgecenter/SSUSPA_5.3.0/com.ibm.omegamon.xe.pm_db2.doc_5.3.0/ko2rr/r0342out.htm.
IBM Knowledge Center—DB2 10—Installation and Migration—Accessed Nov. 9, 2016; http://www.ibm.com/support/knowledgecenter/SSEPEK_10.0.inst/src/tpc/db2z_ipf_librarynameprefix.html.
Jan. 22, 2019—U.S. Office Action—U.S. Appl. No. 15/340,416.
Jun. 20, 2019—U.S. Final Office Action—U.S. Appl. No. 15/340,416.
Oct. 30, 2019—U.S. Notice of Allowance—U.S. Appl. No. 15/340,416.
Christain Inzinger et al., Identifying Incompatible Service Implementations using Pooled Decision Trees, ACM, 2013, retrieved online on Oct. 27, 2019, pp. 485-492. Retrieved from the Internet: <URL:http://delivery.acm.org/10.1145/24900008/2480456/p485-inzinger.pdf?>. (Year: 2013).
Venkatesh-Prasad Ranganath et al., Compatibility Testing using Patterns-based Trace Comparison, ACM, 2014, retrieved online on Oct. 27, 2019, pp. 469-478. Retrieved from the Internet: <URL:http://delivery.acm.org/10.1145/2650000/2642942/p469-ranganath.pdf?>. (Year: 2014).
Loup Meurice, et al., Detecting and Preventing Program Inconsistencies Under Database Schema Evolution, IEEE, 2016, retrieved online on Oct. 23, 2020, pp. 262-273, Retrieved from the Internet: <URL: https://ieeexplore.ieee.org/stamp/stamp.jsp?tp=&amumber=7589806>. (Year: 2016).
Oct. 29, 2020—U.S. Notice of Allowance—U.S. Appl. No. 16/716,617.

* cited by examiner

+DB2WLS1A   DATABASE_TASK  HIGH WORKFILE   USER ENCOUNTERED
SSID=ABCD       APPLICATION_ID=APPLICATION_1    USER_ID=USER_3
PROCESS_ID = PROCESS_1
ACTIVITY_ID=AAAAAA.BBBB.CCCCCCCCCC.C
TYPE=DATA USAGE (KB)=    34742784
WORKFILE LIMIT SPECIFICATION RECORD:
K=N*        *                                *
L =     8000000 (KB)

Database Report Scheduling Interface
REPORT ID=601
TITLE=Database Health Check Report – High Work File Users in 24 hrs

| Act_ID | User_ID | Process ID | App ID | Detec_Last@ | MAX_USE | WLST_HIT | WLST_HIT_GB | DATA_THRES | LIMIT_TYPE |
|---|---|---|---|---|---|---|---|---|---|
| ACT_1 | User_1 | Process_1 | App_1 | YY-DD-MM-08.12.50 | 65.00 | 07.50.19 | 18.00 | 7.00 | WLST |
| ACT_2 | User_1 | Process_1 | App_1 | YY-DD-MM-10.41.50 | 63.00 | 10.22.18 | 13.00 | 7.00 | WLST |
| ACT_3 | User_2 | Process_2 | App_2 | YY-DD-MM-HH.MM.SS | 21.00 | 15.18.19 | 18.00 | 7.00 | WLST |
| ACT_4 | User_2 | Process_2 | App_2 | YY-DD-MM-HH.MM.SS | 65.00 | 15.41.18 | 19.00 | 7.00 | WLST |
| ACT_5 | User_3 | Process_3 | App_2 | YY-DD-MM-HH.MM.SS | 10.00 | 06.14.19 | 8.00 | 7.00 | WLST |

705 710 715 720 725 730 735 740 745 750

FIG. 7

DATABASE WORK FILE STORAGE LIMIT FACILITY

CROSS REFERENCE TO RELATED APPLICATIONS

This application is a continuation of and claims priority to co-pending U.S. application Ser. No. 15/350,775, filed Nov. 14, 2016, and entitled "Database Work File Storage Limit Facility," which is incorporated herein by reference in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used to configure one or more configurable database work file storage limits and perform one or more actions in response to reaching or approaching the work file limits.

BACKGROUND

A system configuration parameter may be used to impose work file storage capping. However, this capping may be a single, system-wide maximum limit applicable for all users. It might not be set differently for different users or different events. Users having high storage usage of workfile resources may negatively affect other users using the workfile resources.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects as disclosed herein are directed to, for example, a system and method of configuring one or more configurable database work file limits and performing one or more actions in response to reaching, approaching, or exceeding the work file limits. The method may comprise determining, by a computing device, a user identifier associated with a user and an application identifier associated with an application. The computing device may determine, based on the user identifier and the application identifier, a workfile storage usage limit associated with the user and the application. The computing device may determine whether a workfile storage usage associated with the user and the application exceeds the workfile storage usage limit. In response to determining that the workfile storage usage associated with the user and the application exceeds the workfile storage usage limit, the method may comprise determining a database language statement (e.g., SQL) associated with the workfile storage usage exceeding the workfile storage usage limit and/or generating a notification comprising the database language statement and the workfile storage usage associated with the user and the application. In some aspects, the method may comprise cancelling a thread associated with the workfile storage usage exceeding the workfile storage usage limit in response to determining that the workfile storage usage associated with the user and the application exceeds the workfile storage usage limit.

Generating the notification may comprise generating the notification comprising the database language statement (e.g., SQL), the workfile storage usage associated with the user and the application, and an indication that the workfile storage usage associated with the user and the application approaches or exceeds the workfile storage usage limit. The method may further comprise sending, by the computing device and for storage in a database, the database language statement, the workfile storage usage associated with the user and the application, and the indication that the workfile storage usage associated with the user and the application approaches or exceeds the workfile storage usage limit.

In some aspects, the method may comprise storing, by the computing device and in a work file limit specification table, the workfile storage usage limit in association with the user identifier and the application identifier. The application described herein may be configured to execute a plurality of processes. Determining the workfile storage usage limit may comprise determining the workfile storage usage limit based on the user identifier, the application identifier, and a process identifier associated with a process of the plurality of processes configured to be executed by the application.

In some aspects, the database language statement may comprise a structured query language (SQL) statement. The notification may comprise a write-to-operator (WTO) notification.

In some aspects, the method may comprise generating, for display on a display device, a notification comprising a timestamp indicating a time when a user or a process having a workfile storage usage approaches or exceeds the workfile storage usage limit, the user identifier, the process identifier, and/or the amount of workfile storage at that point in time. In some aspects, the notification may be re-displayed at a pre-defined interval until the user or the process having the high workfile storage has terminated.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
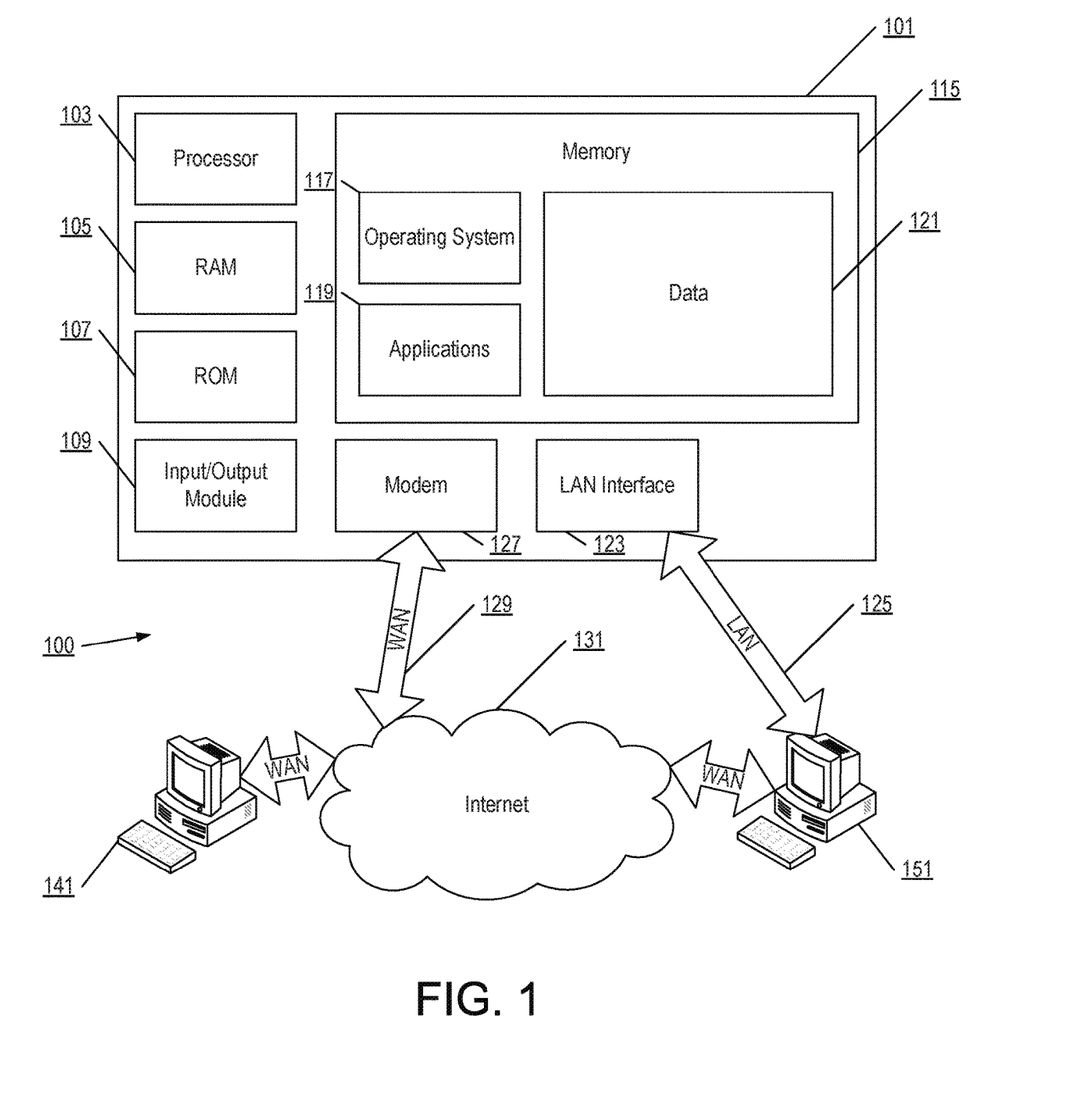
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, other mobile devices, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, and the like) including various other components, such as a battery, speaker, and antennas (not shown).

Figure 2:
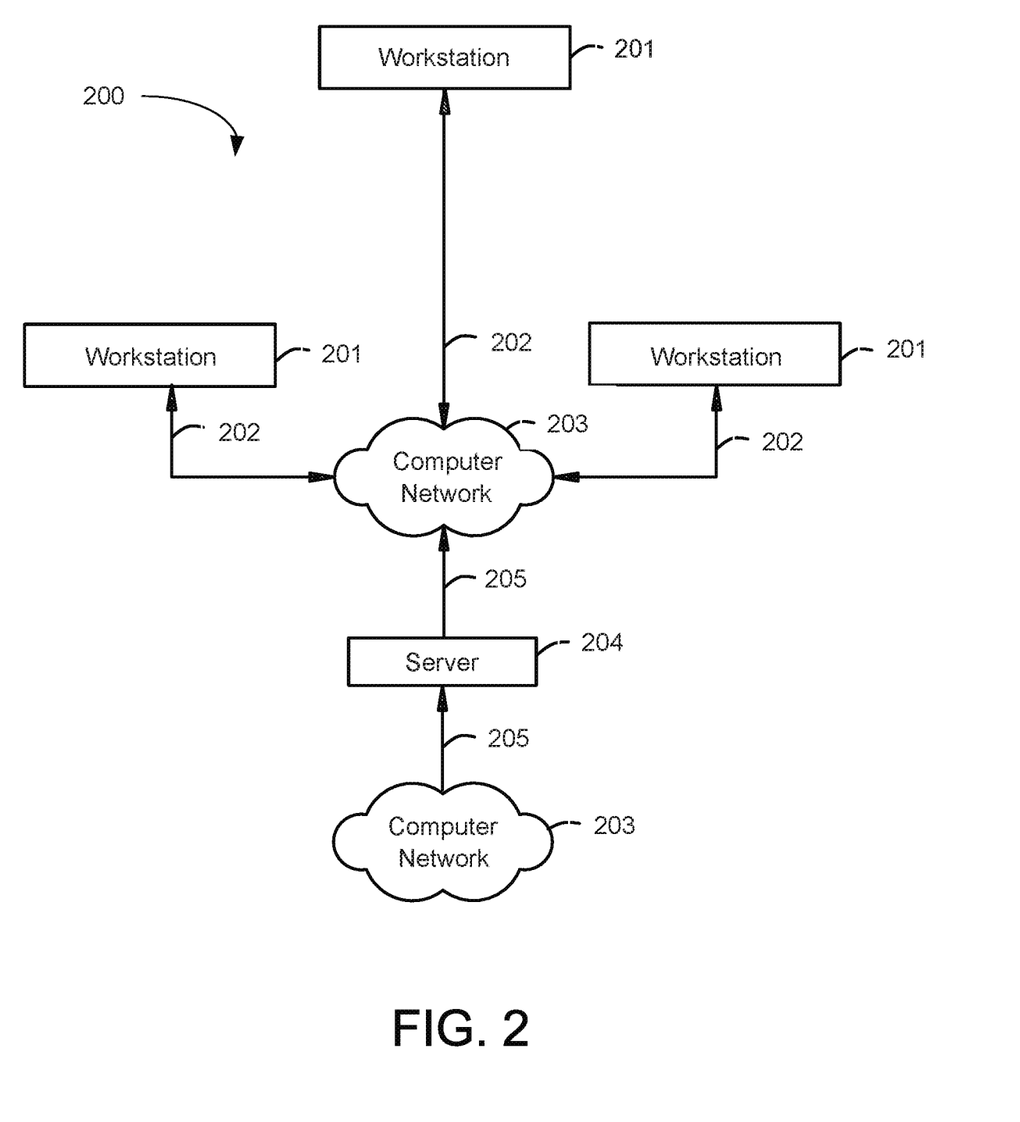
FIG. 2 illustrates another example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. The workstations 201 may be used by, for example, agents or other employees of an institution (e.g., a financial institution) and/or customers of the institution. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Aspects described herein include a database (e.g., Database2 or DB2) work file limit facility. The work file may comprise a database resource, such as resource shared among a plurality of users. Each work file may be assigned a sequence number, such as A001. If additional work file storage is needed, the system may create additional work file storage and assign them sequence numbers, such as A002, A003, and so on. In other words, the database management system may extend the work file storage until some capacity or maximum limit is reached. If the system reaches the capacity or maximum limit, and another user attempts to use a shared resource, the database management system might not be able to service the user, causing the user transaction to fail.

The facility described herein may allow more granular workfile storage capping for different users and/or different processes. The maximum usage limit for users and programs may be predefined. Events (e.g., workfile storage approaching a maximum size limit) may also be predefined, such as when the maximum usage limit is to be imposed. Work file limit facility tasks may monitor the work file usage by starting one or more database traces. The tasks may compare the usage against predefined limits, and may take appropriate actions if the usage exceeds the limit(s) (e.g., writing a message on a console, cancelling the thread, and the like). The work file limit facility may impose a database work file storage capping for database users based on one or more user attribute (e.g., user ID, program the user is running, and the like), type of work file usage, and/or risk of failures. The work file monitor may be enhanced to kick off a work file limit facility task on meeting certain thresholds defined by, for example, a system administrator. The task may monitor work file usage (e.g., using one or more traces), and compare it against the limit imposed for the user. The work file limit facility task may externalize the usage details and/or cancel the user thread to impose the limit.

Aspects described herein may provide more options to have granular capping based on the type of user, the usage, and/or the type of event. Systems and methods described herein may comprise a facility to generate historical work file usage database(s) of high storage users. Work file usage activity of users may be monitored, and a cap via the work file limit facility may be implemented using configuration records for individual users.

Figure 3A:
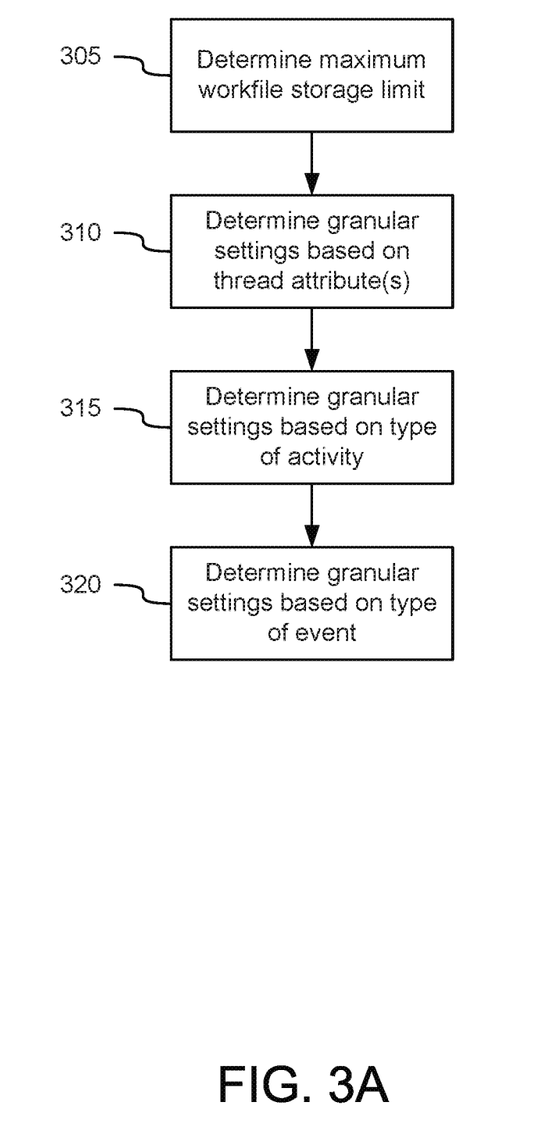
FIG. 3A illustrates an example method for implementing a database work file limit facility in which various aspects of the disclosure may be implemented.

FIG. 3A illustrates an example method for implementing a database work file limit facility in which various aspects of the disclosure may be implemented. The steps illustrated in FIG. 3A may be performed by one or more computing devices, as described herein.

In step 305, the computing device may determine (e.g., read) a maximum work file storage limit to be imposed on one or more threads via one or more work file limit specification table. In some aspects, the computing device may determine granular settings for storage limits based on one or more factors, such as thread attributes, type of activity, type of event, or threat of failures, as will be described in further detail below.

In step 310, the computing device may determine granular settings based on thread attributes, such as users, applications run by users, and/or application processes run by users. For example, the computing device may determine granular settings for each user, and the computing device may determine the user based on a user ID, such as an authentication ID, a username, an alias, or any other unique user identifier. In some aspects, the user may be running one or more applications, threads, and/or queries that use data. The computing device may determine granular settings for each application run by the user, and the computing device may determine the application based on an application identifier, such as an application name, an application program, or any other identifier used to identify the application. The computing device may determine granular settings for each application process (e.g., job), and the computing device may determine the process based on a process identifier, such as a job identifier, an alphanumeric string, or any other unique identifier used to identify the process. An application may run a plurality of processes or jobs.

In step 315, the computing device may determine granular settings based on the type of activity, such as whether the activity uses one or more work files. That is, the user may perform different types of database activities, such as a sort activity (e.g., SORT), a declare global temporary table activity (DGTT), and the like. Each of these activities may use temporary work file storage.

In step 320, the computing device may determine granular settings based on the type of event, such as physical growth of workfile datasets approaching the maximum physical size.

Figure 3B:
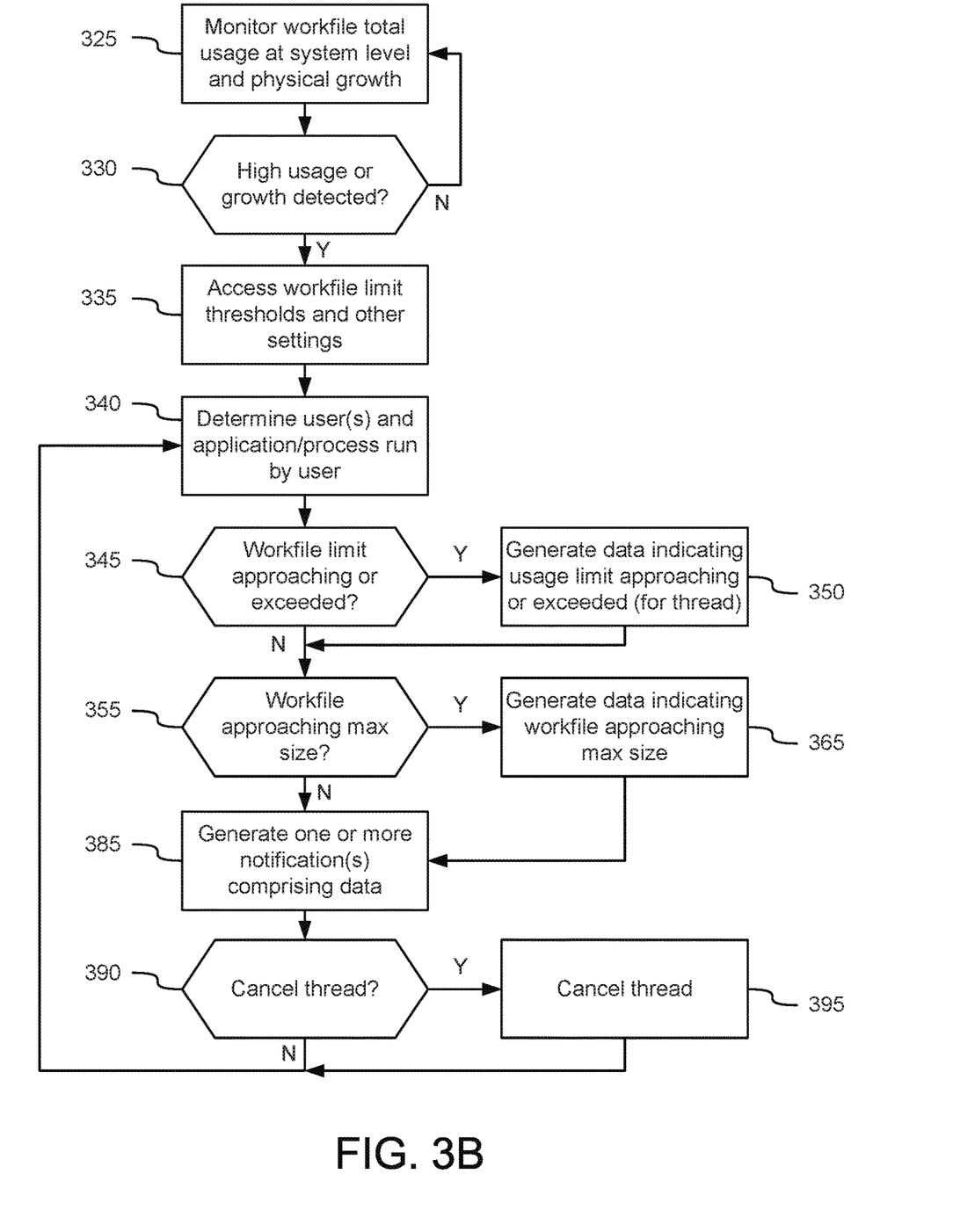
FIG. 3B illustrates an example method for implementing a database work file limit facility in which various aspects of the disclosure may be implemented.

FIG. 3B illustrates an example method for implementing a database work file limit facility in which various aspects of the disclosure may be implemented. The steps illustrated in FIG. 3B may be performed by one or more computing devices, as described herein. In step 325, the computing device may monitor total workfile usage at the system level and physical growth of the workfiles, such as into A002 and/or A003 files, as previously described in paragraph 24. The computing device may initiate appropriate traces, such as IFCID traces 2 and 258 to determine workfile usage or growth events. In step 330, the computing device may compare the usage or growth against a predefined threshold, which may be set by, for example, a DB2 system programmer. The computing device may start a workfile limit subtask when these thresholds are met or exceeded.

In step 335, the computing device may access from storage one or more work file limit(s) or other settings, as previously described.

In step 340, the computing device may determine a user or a process that is using one or more workfile resources. In step 340, the computing device may start a trace, such as IFCID trace 342, to determine the users, applications, and the like requesting workfile storage. In some cases, the computing device may deploy additional logic (e.g., to turn off the trace 342) to minimize overhead associated with the trace. In step 345, the computing device may determine whether the user's workfile storage usage exceeds a workfile storage usage limit. If not (step 345: N), the computing device may proceed to step 355. If the user's workfile storage usage exceeds a workfile storage usage limit (step 345: Y), the computing device may proceed to step 350. In step 350, the computing device may generate data indicating that the user's workfile storage usage exceeds the workfile storage usage limit.

In step 355, the computing device may determine the application or the user process determined in step 340 that is contributing to the physical growth of the workfiles. Also in step 355, the computing device may determine whether the growing workfile is approaching the maximum workfile size limit. If not (step 355: N), the computing device may proceed to step 385. If yes (step 355: Y), the computing device may proceed to step 365. In step 365, the computing device may generate data indicating that the application's workfile storage usage is contributing to the growth of the workfile (and/or approaching a maximum size).

In step 385, the computing device may generate one or more notification(s) comprising the data generated in steps 350, 365, and/or otherwise generated by the system. The computing device may send the one or more notification(s) to the user or an administrator for display on a display device. For example, the computing device may provide one or more offending database language statements, such as structured query language (SQL) statements, to the user or administrator. The notification or message may comprise, for example, a write-to-operator (WTO) message. Additionally or alternatively, the computing device may store, in a data table (e.g., a workfile usage history table), event details (e.g., within a threshold of a workfile storage limit and/or exceed a workfile storage limit), and/or the offending SQL statement.

In the work file limit facility described herein, the computing device may display the query or SQL statement that is running and causing the workfile storage limit(s) to be reached. In some aspects, as soon as the computing device determines that a user is using a significant amount of workfile usage, an alert may be sent. As noted above, the SQL statement may be stored, so that the user or an administrator can go back and review the queries and what caused the queries to approach or exceed limits. A database administrator may review the data in the notification to cancel the query execution or tune it to reduce the amount of workfile used by the particular query on the next run.

In step 390, the computing device may determine whether to cancel (and/or terminate) one or more thread for the user, application, and/or process. If so (step 390: Y), in step 395, the computing device may cancel the thread. In some aspects, a thread may be cancelled by ending the user process or program. The computing device may return to step 340 and identify one or more users, applications, and/or processes to monitor based on work file limit thresholds or other settings.

In some aspects, one or more of the steps described above may be performed in response to a work file limit task or subtask detecting an event. Examples of storage limits will be described in further detail below.

Figure 4:
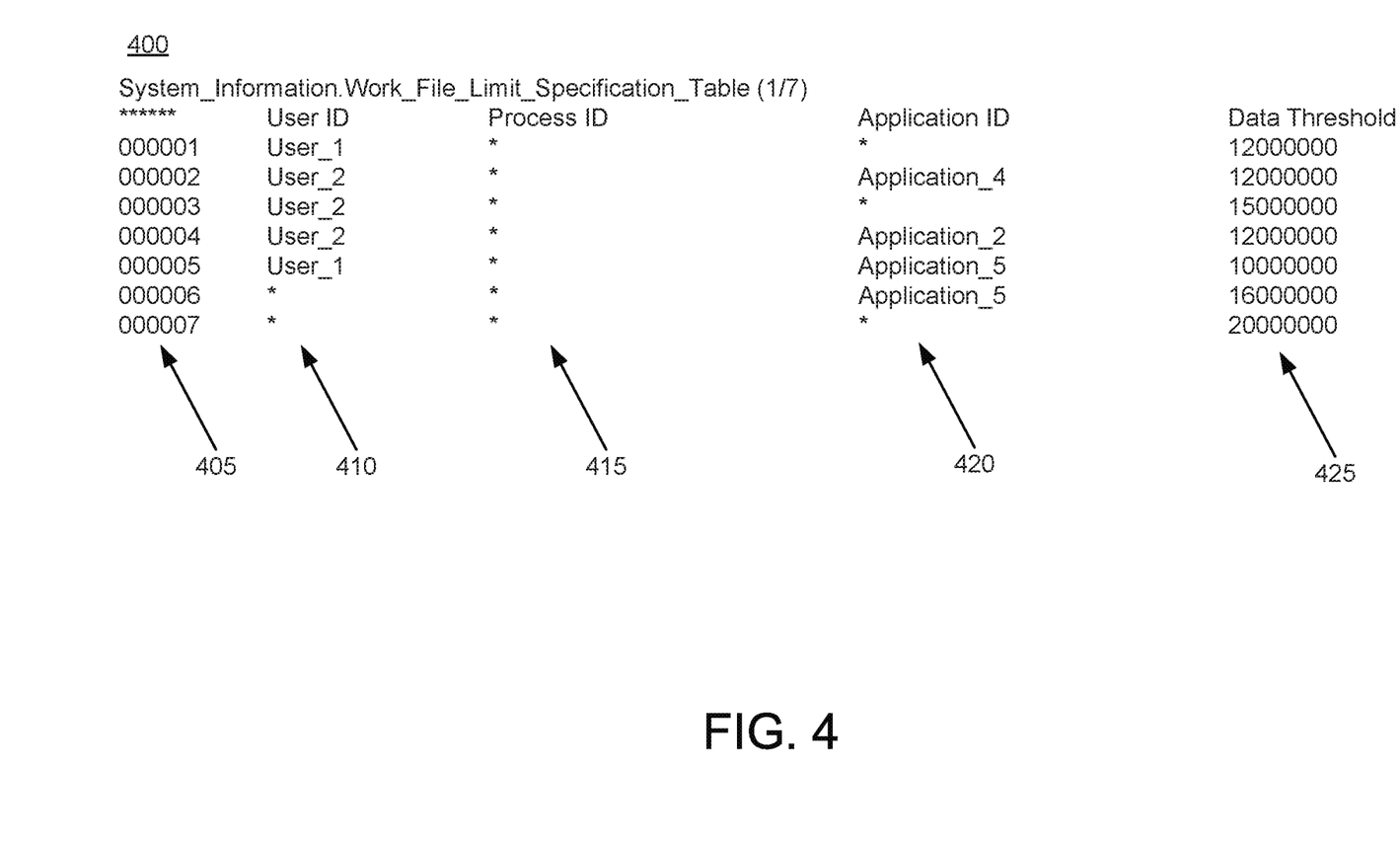
FIG. 4 illustrates an example user interface for implementing a database work file limit facility in which various aspects of the disclosure may be implemented.

FIG. 4 illustrates an example user interface for implementing a database work file limit facility in which various aspects of the disclosure may be implemented. For example, the data illustrated in FIG. 4 may comprise data stored in a particular work file limit specification table 400. As illustrated, the data limits may be configured according to the user, the process, the application, or a combination thereof. The table 400 may comprise a table entry identifier portion 405 (e.g., a column) used to identify the entry (e.g., a row) in the table 400. The table 400 may comprise a user identifier portion 410 (e.g., a column) used to identify the user. The table 400 may comprise a process identifier portion 415 (e.g., a column) used to identify the application process. The table 400 may comprise an application identifier portion 420 (e.g., a column) used to identify the application. The table 400 may comprise a workfile storage limit portion 425 (e.g., a column) used to identify the workfile storage limit threshold for a combination of user, process, and/or application. For example, the workfile storage limit for user 2 (e.g., User_2) and application 4 (e.g., Application_4) may be 12 GB (e.g., as indicated by entry 000002). The workfile storage limit for user 2 (e.g., User_2) across all applications may be 15 GB (e.g., as indicated by entry 000003). The workfile storage limit for user 1 (e.g., User_1) and application 5 (e.g., Application_5) may be 10 GB (e.g., as indicated by entry 000005).

Figure 5:
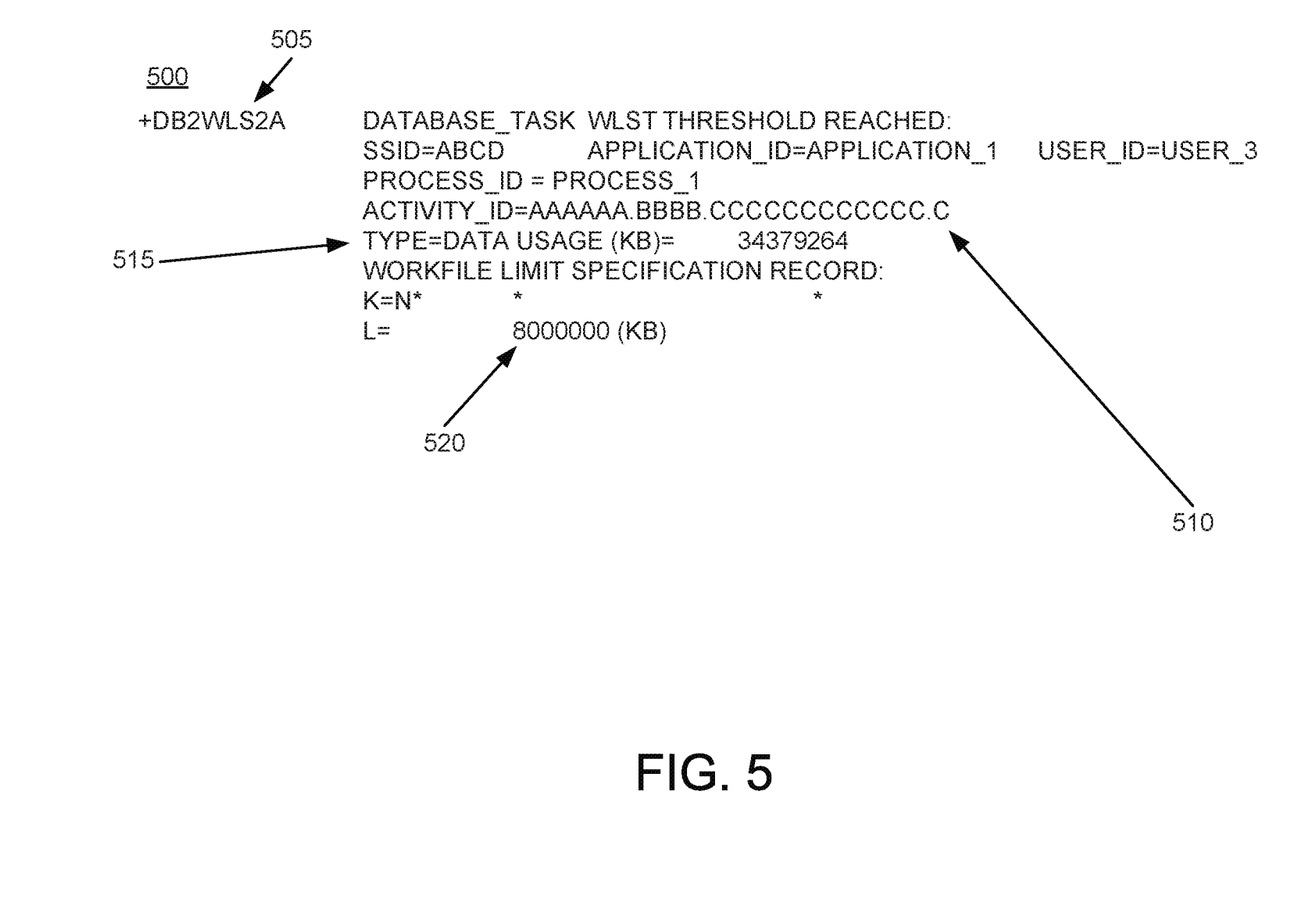
FIG. 5 illustrates an example user interface for implementing a database work file limit facility in which various aspects of the disclosure may be implemented.

FIG. 5 illustrates an example user interface for implementing a database work file limit facility in which various aspects of the disclosure may be implemented. For example, the data illustrated in FIG. 5 may comprise a data output 500 indicating an event, such as a workfile limit being exceeded. The data output 500 may be used to alert a user or database administrator of the event. The data may be stored in a database for future analysis (e.g., to track historical trends, to track particular programs, and the like). This data may also be used to adjust the workfile storage limits, such as to increase or decrease the data limits.

The data output 500 may include a WTO message identifier 505 (e.g., DB2WLS2A) uniquely identifying the data output 500. The data output 500 may also comprise a database ID (e.g., SSID), an application ID, user ID, and process ID. The data output 500 may include an activity ID 510, such as a logical unit-of-work ID (LUWID), that identifies, for example, a user device's IP address, port number, and/or a unique sequence number. The data output 500 may also comprise the workfile storage usage 515 (e.g., 34379264 KB). The data output 500 may also comprise the applicable pre-defined workfile storage limit 520 (e.g., 8000000 KB).

Figure 6:
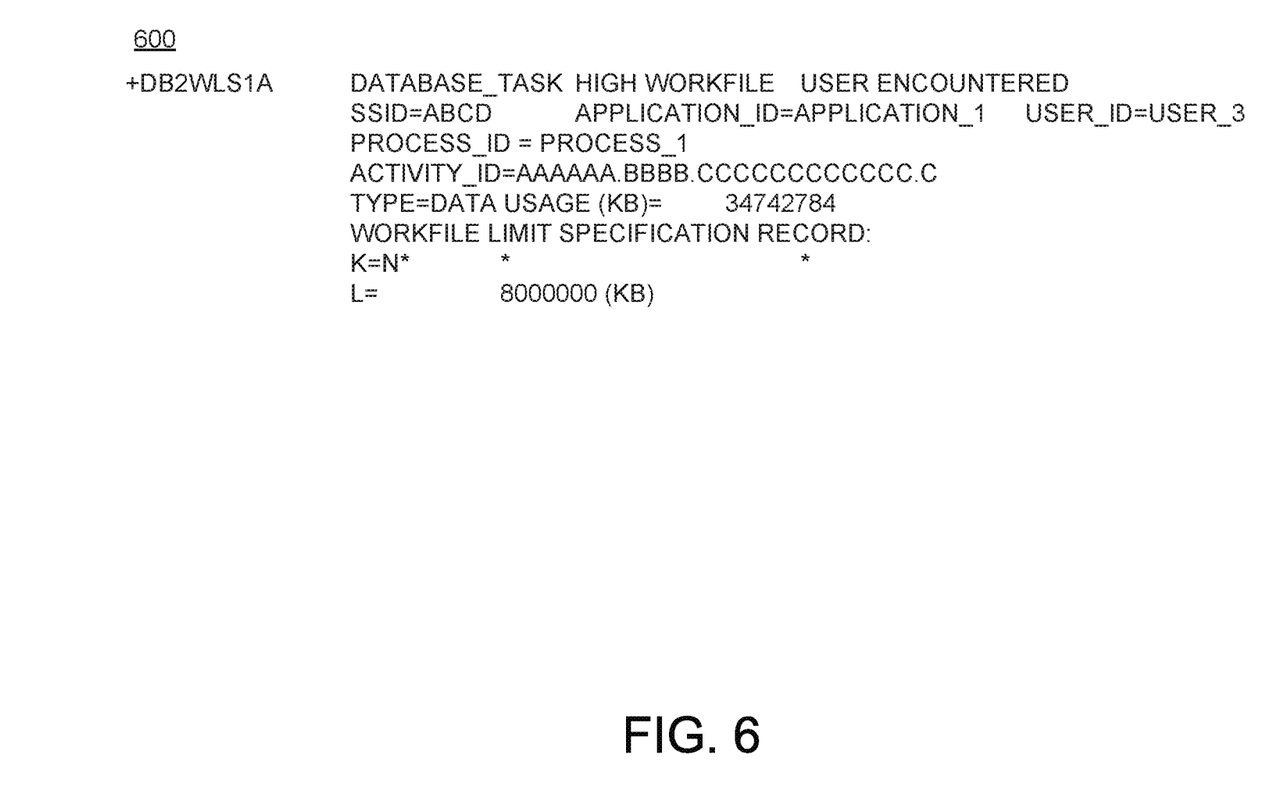
FIG. 6 illustrates an example user interface for implementing a database work file limit facility in which various aspects of the disclosure may be implemented.

FIG. 6 illustrates an example user interface 600 for implementing a database work file limit facility in which various aspects of the disclosure may be implemented. In some aspects, the computing device may utilize staggered data thresholds, such as minimum levels, incremental levels, and the like. The minimum value may comprise a default value (e.g., a starting value). The value may be incremented for each alert. Messages (e.g., WTO messages) may be externalized until the total workfile usage has fallen below a monitoring level (e.g., due to completion, cancellation or termination of the resource intensive thread). For example, if the starting level is 50 GB, and the incremental value is 10 GB, messages may be written at 50 GB, 60 GB, 70 GB, and so on. A monitor may capture a snapshot of IFCID 342 workfile storage request data at 10 GB increments. This may be helpful for the computing device to determine whether the thread is approaching the maximum storage limit. As previously described, the offending SQL statements may be written to, for example, data tables.

Figure 7:
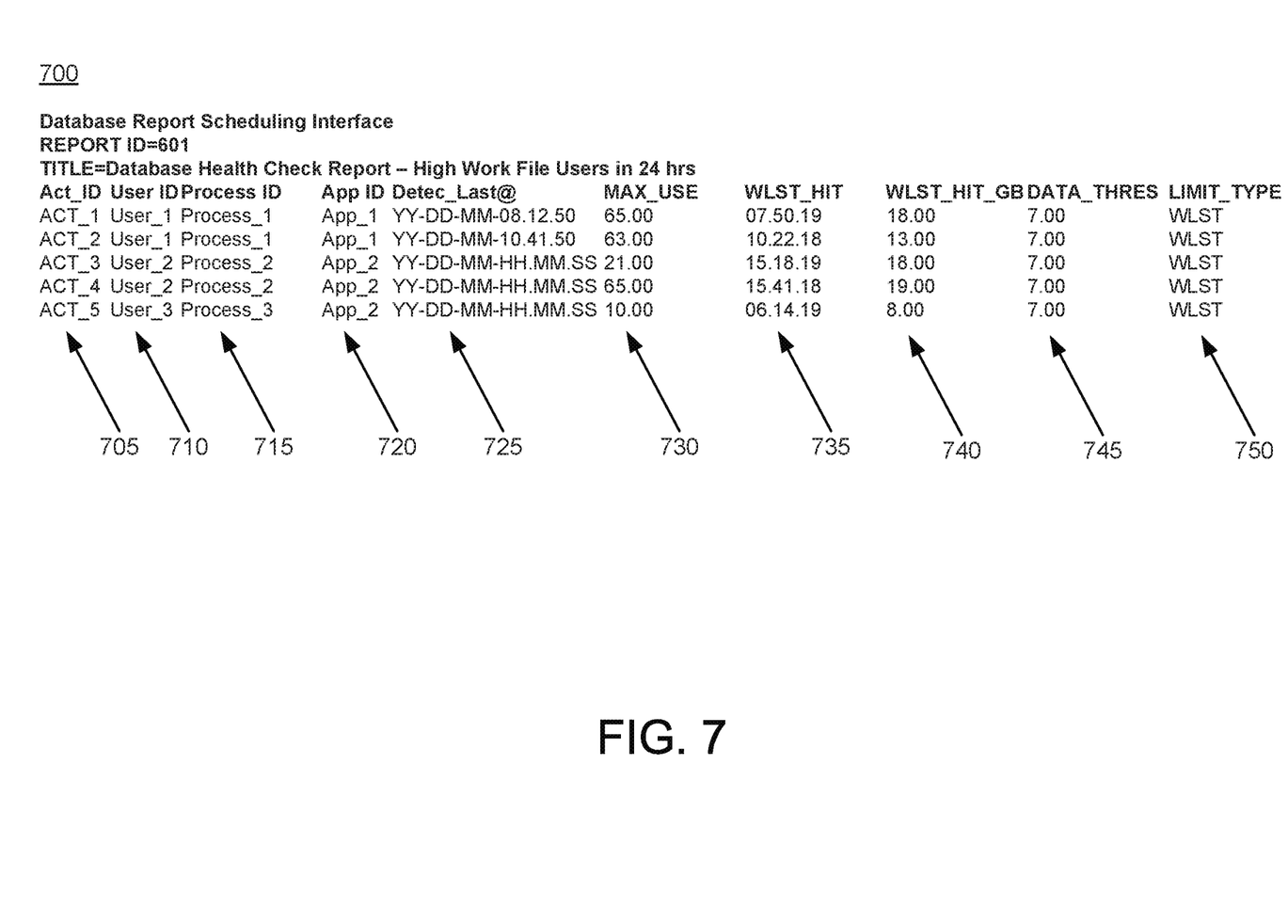
FIG. 7 illustrates an example user interface for implementing a database work file limit facility in which various aspects of the disclosure may be implemented.

FIG. 7 illustrates an example user interface for implementing a database work file limit facility in which various aspects of the disclosure may be implemented. For example, the data illustrated in FIG. 7 may comprise a work file limit report 700 showing users with high work file storage and/or an indication of whether one or more workfile limits was reached. The report 700 may include activity IDs 705 (e.g., LUWIDs), user IDs 710, process IDs 715, and/or application IDs 720.

The report may include a date and time the activity occurred 725. The report may also indicate the maximum storage 730 used by the process. The report 700 may include a work file limit specification table hit 735, which may indicate the time (e.g., a timestamp) that the limit was reached. The report 700 may include the amount of data used by the user 740 when the limit was reached. The report 700 may include the workfile threshold or limit 745 (e.g., in GB). The report 700 may indicate the limit type (e.g., WLST limit). As a brief example and with respect to the first entry (ACT_1), the user (User_1) may have used 18 GB of data at time 07.50.19. In this example, the thread was not cancelled when the user exceeded the workfile storage limit, and the user may have reached a maximum workfile use of 65 GB. The user thread may have been active until, for example, time (e.g., timestamp) 08.12.50.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
   determining, by a computing device and based on a user identifier associated with a user, an application identifier associated with an application, and a type of event, a workfile storage usage limit associated with the user and the application;
   determining, by the computing device, whether a workfile storage usage associated with the user and the application approaches or exceeds the workfile storage usage limit; and
   in response to determining that the workfile storage usage associated with the user and the application approaches or exceeds the workfile storage usage limit:

determining, by the computing device, a database language statement associated with the workfile storage usage approaching or exceeding the workfile storage usage limit;

storing, in a data table, event details and the database language statement; and generating, for display on a display device, a notification comprising a timestamp indicating a time that the workfile storage usage approached or exceeded the workfile storage usage limit or a time when the workfile storage usage approaches the workfile storage usage, the user identifier, the application identifier, and an amount of the workfile storage usage at the timestamp.

2. The method of claim 1, further comprising:

in response to determining that the workfile storage usage associated with the user and the application approaches or exceeds the workfile storage usage limit, cancelling a thread associated with the workfile storage usage approaching or exceeding the workfile storage usage limit.

3. The method of claim 1, further including generating a notification including the database language statement, the workfile storage usage associated with the user and the application, and an indication that the workfile storage usage associated with the user and the application approaches or exceeds the workfile storage usage limit.

4. The method of claim 1, further comprising:

storing, by the computing device and in a work file limit specification table, the workfile storage usage limit in association with the user identifier and the application identifier.

5. The method of claim 1, wherein the application is configured to execute a plurality of processes, and wherein determining the workfile storage usage limit comprises determining the workfile storage usage limit based on the user identifier, the application identifier, the type of event and a process identifier associated with a process of the plurality of processes configured to be executed by the application.

6. The method of claim 1, wherein the database language statement comprises a structured query language (SQL) statement, and wherein a notification comprises a write-to-operator (WTO) notification.

7. An apparatus, comprising:

a processor; and memory storing computer-executable instructions that, when executed by the processor, cause the apparatus to:

determine, based on a user identifier associated with a user, an application identifier associated with an application, and a type of event, a workfile storage usage limit associated with the user and the application;

determine whether a workfile storage usage associated with the user and the application approaches or exceeds the workfile storage usage limit; and in response to determining that the workfile storage usage associated with the user and the application approaches or exceeds the workfile storage usage limit:

determine a database language statement associated with the workfile storage usage approaching or exceeding the workfile storage usage limit;

store, in a data table, event details and the database language statement; and generate, for display on a display device, a notification comprising a timestamp indicating a time that the workfile storage usage approached or exceeded the workfile storage usage limit or a time when the workfile storage usage approaches the workfile storage usage, the user identifier, the application identifier, and an amount of the workfile storage usage at the timestamp.

8. The apparatus of claim 7, wherein the memory stores additional computer-executable instructions that, when executed by the processor, cause the apparatus to:

in response to determining that the workfile storage usage associated with the user and the application approaches or exceeds the workfile storage usage limit, cancel a thread associated with the workfile storage usage approaching or exceeding the workfile storage usage limit.

9. The apparatus of claim 7, wherein the memory stores additional computer-executable instructions that, when executed by the processor, cause the apparatus to: generate a notification including the database language statement, the workfile storage usage associated with the user and the application, and an indication that the workfile storage usage associated with the user and the application approaches or exceeds the workfile storage usage limit.

10. The apparatus of claim 7, wherein the memory stores additional computer-executable instructions that, when executed by the processor, cause the apparatus to:

store, in a work file limit specification table, the workfile storage usage limit in association with the user identifier and the application identifier.

11. The apparatus of claim 7, wherein the application is configured to execute a plurality of processes, and wherein determining the workfile storage usage limit comprises determining the workfile storage usage limit based on the user identifier, the application identifier, the type of event, and a process identifier associated with a process of the plurality of processes configured to be executed by the application.

12. The apparatus of claim 7, wherein the database language statement comprises a structured query language (SQL) statement, and wherein a notification comprises a write-to-operator (WTO) notification.

13. One or more non-transitory computer-readable medium having instructions stored thereon that, when executed by one or more computing devices, cause the one or more computing devices to:

determine, based on a user identifier associated with a user and an application identifier associated with an application, and a type of event, a workfile storage usage limit associated with the user and the application;

determine whether a workfile storage usage associated with the user and the application approaches or exceeds the workfile storage usage limit; and in response to determining that the workfile storage usage associated with the user and the application approaches or exceeds the workfile storage usage limit:

determine a database language statement associated with the workfile storage usage approaching or exceeding the workfile storage usage limit;

store, in a data table, event details and the database language statement; and generate, for display on a display device, a notification comprising a timestamp indicating a time that the workfile storage usage approached or exceeded the workfile storage usage limit or a time when the workfile storage usage approaches the workfile storage usage, the user identifier, the application identifier, and an amount of the workfile storage usage at the timestamp.

14. The one or more non-transitory computer-readable medium of claim 13, having computer-readable instructions stored thereon that, when executed by the one or more computing devices, cause the one or more computing devices to:

in response to determining that the workfile storage usage associated with the user and the application approaches or exceeds the workfile storage usage limit, cancel a thread associated with the workfile storage usage approaching or exceeding the workfile storage usage limit.

15. The one or more non-transitory computer-readable medium of claim 13, wherein the one or more non-transitory computer-readable has computer-readable instructions stored thereon that, when executed by the one or more computing devices, cause the one or more computing devices to: generate a notification including the database language statement, the workfile storage usage associated with the user and the application, and an indication that the workfile storage usage associated with the user and the application approaches or exceeds the workfile storage usage limit.

16. The one or more non-transitory computer-readable medium of claim 13, having computer-readable instructions stored thereon that, when executed by the one or more computing devices, cause the one or more computing devices to:

store, in a work file limit specification table, the workfile storage usage limit in association with the user identifier and the application identifier.

17. The one or more non-transitory computer-readable medium of claim 13, wherein the application is configured to execute a plurality of processes, and wherein determining the workfile storage usage limit comprises determining the workfile storage usage limit based on the user identifier, the application identifier, the type of event, and a process identifier associated with a process of the plurality of processes configured to be executed by the application.

18. The one or more non-transitory computer-readable medium of claim 13, wherein the database language statement comprises a structured query language (SQL) statement, and wherein a notification comprises a write-to-operator (WTO) notification.

* * * * *